United States Patent
Bao et al.

(10) Patent No.: US 8,875,247 B2
(45) Date of Patent: Oct. 28, 2014

(54) INSTANT PERSONALIZATION SECURITY

(71) Applicant: Facebook, Inc., Menlo Park, CA (US)

(72) Inventors: Ling Bao, San Mateo, CA (US);
Andrew Chi-An Yang, San Francisco, CA (US); Pratap Prabhu, Sunnyvale, CA (US); Alex Rice, Palo Alto, CA (US); Joey Tyson, Redwood City, CA (US); Naitik Shah, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 54 days.

(21) Appl. No.: 13/804,924

(22) Filed: Mar. 14, 2013

(65) Prior Publication Data

US 2014/0282884 A1  Sep. 18, 2014

(51) Int. Cl.
*H04L 29/06* (2006.01)
*G06F 21/31* (2013.01)

(52) U.S. Cl.
CPC ..................................... *G06F 21/31* (2013.01)
USPC ................. 726/4; 713/183; 713/176; 726/29; 726/27; 709/203; 704/260; 455/456

(58) Field of Classification Search
USPC ............................................................. 726/4
See application file for complete search history.

(56) References Cited

U.S. PATENT DOCUMENTS

| | | | |
|---|---|---|---|
| 8,522,011 B2 * | 8/2013 | Spalka et al. | 713/156 |
| 8,533,860 B1 * | 9/2013 | Grecia | 726/29 |
| 2005/0278535 A1 * | 12/2005 | Fortune et al. | 713/176 |
| 2007/0234062 A1 * | 10/2007 | Friedline | 713/183 |
| 2009/0070412 A1 * | 3/2009 | D'Angelo et al. | 709/203 |

OTHER PUBLICATIONS

Defending Against Large-scale Crawls in Online Social Networks|http://conferences.sigcomm.org/co-next/2012/eproceedings/conext/p325.pdf|Mondal et al.|2012|pp. 1-12.*

* cited by examiner

*Primary Examiner* — Mahfuzur Rahman
(74) *Attorney, Agent, or Firm* — Perkins Coie LLP

(57) ABSTRACT

A method and system for instant personalization security are provided. The system includes a platform for a user to open applications and/or access web sites. When an application is integrated with the platform, the identification of the application can be combined with the ID of the user and encrypted into a hashed ID. The application does not have access to the user's fully identifying profile (e.g., UID or other public information). Instead, the application only has access to a pseudonymous profile (e.g., the hashed ID, first name, last initial, small profile pictures, and/or other non-fully identifying profile information) of the user. One or more options are then provided for the user to authorize or reject the application to access the user's fully identifying profile. Upon the user's authorization, an access token is provided to the application to access a subset of the user's fully identifying profile.

20 Claims, 6 Drawing Sheets

INSTANT PERSONALIZATION SECURITY

TECHNICAL FIELD

Various embodiments of the present disclosure generally relate to providing users with a personalized experience when visiting websites or using applications, and in particular to instant personalization security.

BACKGROUND

Instant personalization is a feature that allows a user's experience to be personalized the moment that users visits a third party app or website by bringing the user's profile with the user. The user's profile may include the user's name, profile picture, gender, networks, friend list, and other information the user has made available. The third party website can present the user a personalized webpage and/or application based on the user's profile.

For example, when a specific user visits a movie review site while logged into a social networking site, the social networking site may share the specific user's profile with the movie review site unnoticeably in the background. Based on the specific user's profile, the movie review site can provide the specific user a personalized experience, such as a greeting with the specific user's name, letting the specific user see movies that friends of the specific user have rated or reviewed, and giving movie recommendations based on movies that the specific user has previously "liked."

However, security abuses (e.g., open redirects and XSS attacks) have become a concern for platforms facilitating instant personalization. A particular class of abuses involves platforms providing third-party applications with users' fully identifying profiles. Here, fully identifying profiles refer to profile information that unambiguously identifies specific individuals. Profiles that include a user's full name along with gender and networks often unambiguously identify individuals. Similarly, profiles that include IDs that may be used to lookup a user's full name, gender, and networks can in turn be used to unambiguously identify individuals.

Malicious apps and websites can redirect visitors to third-party software (e.g., applications and websites/webpages) that integrate with instant personalization platforms that provide fully identifying profiles. These redirects can happen in background browser windows or quickly without visitor knowledge. Upon redirect, these platforms will provide the third-party software (e.g., applications, websites) with fully identifying profiles for the visitors. The malicious app or website can then exploit any open redirect or XSS vulnerability in the third-party applications and websites to retrieve the visitors' fully identifying profiles. This in turn can be used to blackmail users who visit compromising malicious apps and websites. In general, platforms facilitating instant personalization through fully identifying profiles are subject to a range of such attacks.

SUMMARY

Embodiments of the present disclosure provide a variety of methods and systems for instant personalization security. The system includes a graph API server to interact with a particular user device. When the particular user logs onto the system, the system may provide a platform instantiated on the particular user device for the particular user to use applications or visit websites. When a specific application is integrated with the platform, the specific application does not have access to the particular user's fully identifying profile. The particular user has options to either authorize or reject releasing the user's fully identifying profile to the specific application. The user's fully identifying profile may include the user's full name or user identification (UID). UID is a unique number assigned to the particular user's profile in the system that can in turn be used to look up the user's full name.

Without the particular user's authorization, the specific application only has access to a pseudonymous profile. The pseudonymous profile may include the user's first name, last initial, and a small profile picture of the particular user along with the first names, last initials, and small profile pictures of the user's friends. The specific application can still provide certain personalized experiences to the particular user based on the released pseudonymous profile (e.g., providing greetings on a first name basis, content from friends on landing, ranking ladders with the user's friends depicted alongside). However, the pseudonymous profile cannot be used to reverse lookup the particular user's fully identifying profile in the system. Therefore, the user's fully identifying profile can be shielded from many of the privacy vulnerabilities of the specific application.

In some embodiments, the specific application's ID can be combined with the particular user's UID in the system and encrypted into a hashed ID. The hashed ID is unique to the particular user and thus can be used by the specific application to identify the particular user going forward. Via the hashed ID, the specific application can access the pseudonymous profile of the particular user. The pseudonymous profile may also include the user's friends' hashed IDs, which can be used by the specific application to identify friends of the user who are also using the application.

One or more options can be provided for the particular user to authorize or reject the specific application to access the particular user's fully identifying profile (e.g., UID, full name) in the system. Upon the user's authorization, an access token can be provided to the specific application to access a subset of the particular user's fully identifying profile (e.g., UID).

In some embodiments, the platform is configured to communicate with the system and/or directly with the graph API server, which stores the particular user's fully identifying profile and pseudonymous profile. The particular user's fully identifying profile may include, but is not limited to, the particular user's full name or UID, profile picture, gender, birthday, networks, friend list, location, language, country, likes, favorite brands, news, outlets, restaurants, and any information the particular user chooses to share.

In some embodiments, a banner can be provided for the particular user to authorize or reject the specific application to access his or her fully identifying profile in the system. The banner's size, text size/color, and location on the platform may be dependent on the attributes of the specific application and the particular user's preferences. The banner requires the particular user to affirmatively act on one of the provided options or close the banner to complete authorization or rejection of the specific application.

In some embodiments, a pop-up box may also be provided for the particular user to authorize or reject the specific application to access the user's fully identifying profile. The pop-up box can be introduced non-intrusively and does not interrupt the particular user's experience with the specific application. In some implementations, the pop-up box may open in front of the specific application's window, thereby forcing the particular user to take affirmative action such as, for example, clicking on one of the options provided by the pop-up box, or closing the pop-up box.

The banner and/or the pop-up box may include options for the particular user to select and authorize different levels of privacy (e.g., level 1, level 2, and level 3) regarding different applications. Each level of privacy corresponds to a specific subset of the user's fully identifying profile.

In some embodiments, the specific application, the banner, and/or the pop-up box may be presented to the particular user on different GUI interfaces. The particular user may bring the specific application in front of or behind the banner and/or the pop-up box.

In some embodiments, the particular user can take alternative actions to grant the specific application authorization to access the user's fully identifying profile in the system. For example, the particular user can choose to pay the specific application with the particular user's account on the networking system or respond to a permission dialog from the specific application. The system may treat these alternative actions as authorizations to release the particular user's fully identifying profile to the specific application.

When the particular user takes an affirmative action either authorizing or rejecting the specific application to access the user's fully identifying profile, the banner and/or pop-up box for the specific application may fade away permanently. In some embodiments, whenever the specific application is re-integrated with the platform, options are provided for the particular user to authorize or reject access by the specific application. If the particular user rescinds a prior authorization or decides to disable the specific application, the platform and/or the networking system can stand proxy to request the specific application's provider to delete the particular user's fully identifying profile. In the absence of users' fully identifying profiles, users of the specific application may identify, invite, and communicate with each other based on users' hashed IDs and other pseudonymous profiles.

In some embodiments, the birthday of the particular user can be combined with the user's UID and the specific application's ID to generate a hashed ID for the particular user and the specific application.

In some embodiments, the hash function is a one-way hash function. The hash function may include, but is not limited to, GOST, HAVAL, MD2, MD4, MD5, PANAMA, RADIOGATUN, RIPEMD, RIPEMD-128/256, RIPEMD-160, RIPEMD-320, SHA-0, SHA-1, SHA-256/224, SHA-512/384, SHA-3, TIGER(2)-192/160/128, WHIRLPOOL, or any combination thereof.

In some embodiments, the combination IDs of the specific application's ID and the user's UID are salted with a sequence of bytes before being passed through the hash function. The sequence of bytes can be a fixed sequence of bytes, a variable sequence of bytes, and/or a randomly generated sequence of bytes.

In some embodiments, the hash function is iteratively applied to the combined IDs for n times. In the first repetition, the combined IDs are passed as input to the hash function. In subsequent repetitions, output of the hash function is passed as input to the same hash function. The same process is repeated for n times, in which n can be equal or larger than 1,000, to generate the final hashed ID.

In some embodiments, instant personalization security can be implemented on desktop web pages and mobile web pages. For example, an iFrame can be hosted on a particular user device for the particular user to access web pages to use mobile applications and/or visit web sites.

While multiple embodiments are disclosed, still other embodiments of the present disclosure will become apparent to those skilled in the art from the following detailed description, which shows and describes illustrative embodiments of the invention. As will be realized, the invention is capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
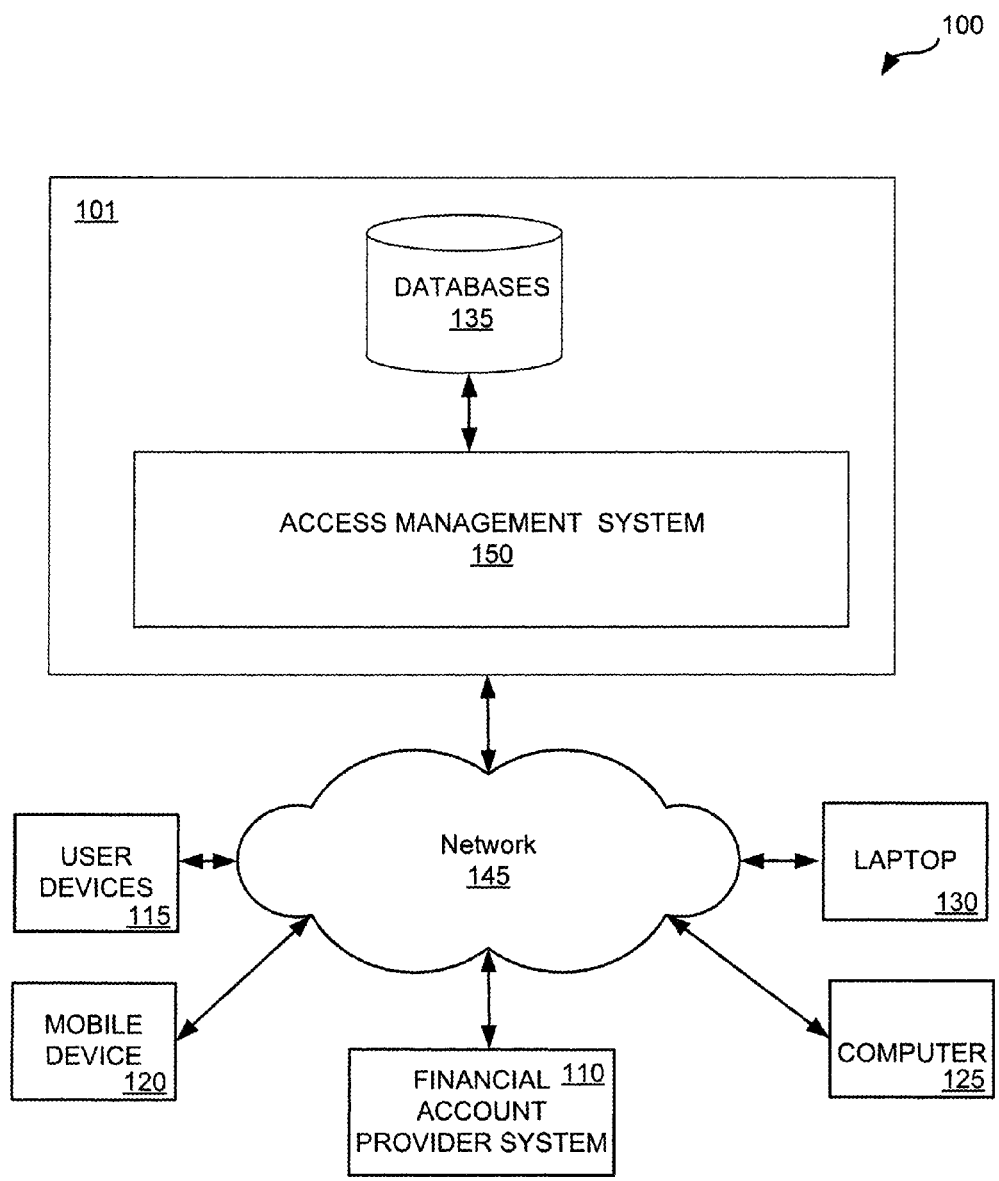
FIG. 1 illustrates an example of a system environment 100 for a networking system 101 in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various embodiments of the present disclosure generally relate to providing users with a personalized experience when users visit websites or use applications. More specifically, various embodiments of the present disclosure relate to systems and methods for providing instant personalization security. Traditionally, when a specific application is integrated with a platform provided by a service provider, the service provider shares the particular user's fully identifying profile with the specific application. The specific application may further share the particular user's fully identifying profile with other service and application providers inconspicuously. In contrast, various embodiments of the present disclosure support providing the specific application the pseudonymous profile of a particular user. In some embodiments, the particular user's user identification (UID) can be combined with the specific application's identification, and encrypted into a hashed ID. The specific application only has access to the hashed ID unless explicitly authorized by the particular user. Upon the user's authorization, an access token is provided to the specific application to access a subset of the particular user's fully identifying profile.

While examples described herein refer to a networking system, the descriptions should not be taken as limiting the scope of the present disclosure. Various alternatives, modifications, and equivalents will be apparent to those skilled in the art without varying from the spirit of the invention. For example, instant personalization security may be implemented on any user device in using an application or any computing system for providing a service to users. For another example, instant personalization security may be implemented in any computing system having a web server system. The web server system may include a database management system (DBMS), such as HBase, MySQL, FoxPro, IBM DB2, Linter, Microsoft SQL Server, Oracle, PostgreSQL, and SQLite, etc.

FIG. 1 illustrates an example of a system environment 100 for a networking system 101 in which some embodiments of the present disclosure may be utilized. The system environment 100 shown in FIG. 1 includes a networking system 101, user devices 115, a financial account provider system 110 and a network 145. In other embodiments, the system environment 100 may include different and/or additional components than those shown by FIG. 1.

The networking system 101, further described below in conjunction with FIG. 2, comprises one or more computing devices storing user profiles associated with users and/or other objects as well as connections between users and other users and/or objects, an access management system 150 and a plurality of databases, such as database 135. Users can store data (e.g., photos, videos, messages, electronic documents, e-mails, records) and related analytics (e.g., usage analytics) in the networking system 101. The data can be submitted through various user devices 115 and/or other devices to allow the data to be stored on database 135. As illustrated in FIG. 1, these devices and tools may use network 145 to submit and retrieve information from the networking system 101.

In some embodiments, users join the networking system 101 and then add connections to other users or objects of the networking system 101 to which they desire to be connected. As further described below in conjunction with FIG. 1, users of the networking system 101 may be individuals or entities such as businesses, organizations, universities and manufacturers. The networking system 101 allows its users to interact with each other as well as with other objects maintained by the networking system 101. In some embodiments, the networking system 101 allows users to interact with third-party websites and the financial account provider 110.

Based on stored data about users, objects and connections between users and/or objects, the networking system 101 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the networking system 101 modifies edges connecting the various nodes to reflect the interactions.

In some embodiments, the networking system 101 generates web pages. When receiving a request of a specific web page from a particular user device, the networking system 101 may provide the web page based on factors such as specific attributes, parameters, and settings of the particular user device and/or application requesting the specific web page etc. The networking system 101 may further provide links to static resources that are not stored on the system 101.

User devices 115 can be any computing device capable of receiving user input as well as transmitting and/or receiving data via the network 145. In one embodiment, user devices 115 are a conventional computer system such as a computer 125 or laptop 130. In another embodiment, user devices 115 may be a mobile device 120 having computer functionality, such as a personal digital assistant (PDA), mobile telephone, smart phone, or similar device. User devices 115 are configured to communicate with access management system 150, and/or the financial account provider via the network 145. In one embodiment, a user device executes an application allowing a user of the user devices to interact with the access management system 150. For example, user devices 115 can execute a browser application to enable interaction between the user devices 115 and access management system 150 via the network 145. In another embodiment, user devices 115 interact with access management system 150 through an application programming interface (API) that runs on the native operating system of the user device 115, such as IOS® or ANDROID™.

User devices 115 can be configured to communicate via the network 145, which may comprise any combination of local area and/or wide area networks, using both wired and wireless communication systems. In one embodiment, the network 145 may include one or more networks of any type (i.e., wired and/or wireless). For example, the network 145 may include a wide area network (WAN), a local area network (LAN), an ad hoc network, the Internet, an intranet, a personal area network (PAN), a storage area network, a home area network, a campus area network, a backbone network, a metropolitan area network (MAN), an enterprise private network, a virtual private network, a virtual network, a cellular telephone network, a satellite network, a telephone network (e.g., a Public Switched Telephone Network (PSTN)), an internet-work, or a combination of two or more of these. The network 145 may use technologies such as Ethernet as defined by IEEE 802.XX, 4 G Long Term Evolution (LTE), 3rd Generation Partnership Project (3GPP), Global System for Mobile Communications (GSM), Enhanced Data Rates for GSM Evolution (EDGE), Universal Mobile Telecommunications System (UMTS), High Speed Packet Access (HSPA), Code Division Multiple Access (CDMA), Worldwide Interoperability for Microwave Access (WiMAX), International Mobile Telecommunications-Advanced (IMT-Advanced), or a combination of two or more of these.

The networking protocols used in the network 145 may include Transmission Control Protocol (TCP) and Internet Protocol (IP), Internetwork Packet Exchange/Sequenced Packet Exchange (IPX/SPX), User Datagram Protocol (UDP), Internet Control Message Protocol (ICMP), Hypertext Transfer Protocol (HTTP), Post Office Protocol (POP3), File Transfer Protocol (FTP), Internet Message Access Protocol (IMAP), X.25, AX.25, AppleTalk, or a combination of two or more of these. Data exchanged over the network 145 may be represented using formats such as HTML, SGML-based HTML, and/or XML-based HTML etc.

Figure 2:
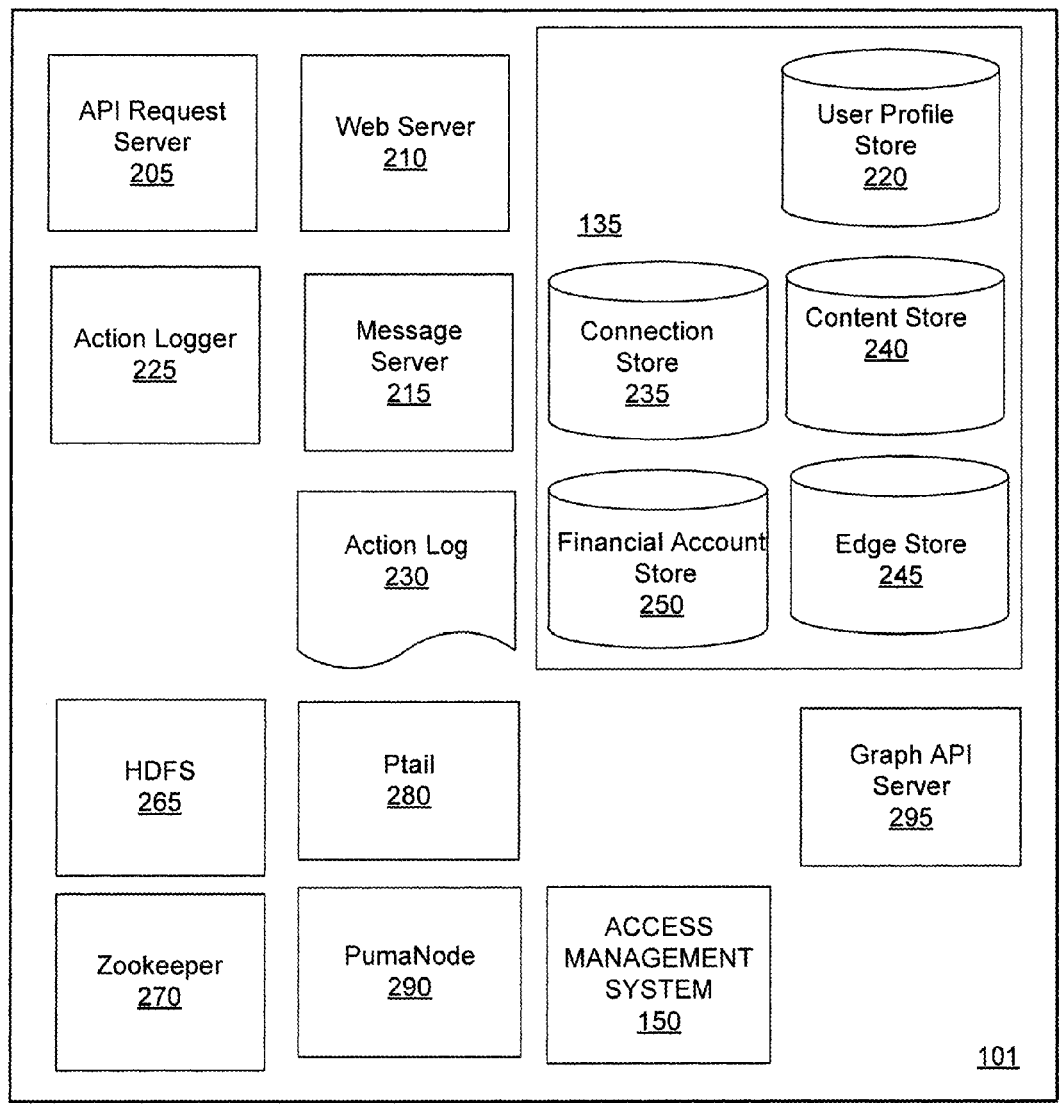
FIG. 2 illustrates a block diagram of a system architecture of the networking system 101 in accordance with one or more embodiments of the present disclosure.

FIG. 2 is a block diagram of system architecture of the networking system 101, in accordance with one or more embodiments of the present disclosure. The networking system 101 shown by FIG. 2 includes an access management system 150, an action logger 225, an API request server 205, a message server 215, a web server 210, an action log 230, a Ptail 280, a Puma node 290, a Hadoop Distributed File System (HDFS) 265, a Zookeeper 270, and a database 135 (i.e., a user profile store 220, a content store 240, an edge store 245, a financial account store 250, and a connection store 235). In some embodiments, the networking system 101 may include additional, fewer or different modules for various applications. Conventional components such as network interfaces, security mechanisms, load balancers, failover servers, management and network operations consoles, and the like are not shown so as to not obscure the details of the system architecture.

Each user of the networking system 101 is associated with a user profile, which is stored in the user profile store 220. A user profile includes declarative information about the user that was explicitly shared by the user, and may also include profile information inferred by the networking system 101. In one embodiment, a user profile includes multiple data fields, each data field describing one or more attributes of the corresponding user of the networking system 101. The user profile information stored in user profile store 220 describes the users of the networking system 101, including biographic, demographic and other types of descriptive information, such as work experience, educational history, gender, hobbies or preferences, location, and the like. A user profile may also store other information provided by the user, for example, images, videos, or other objects. In certain embodiments, images of users may be tagged with identification information on users of the networking system 101 displayed in an image. A user profile in the user profile store 220 may also maintain references to actions by the corresponding user performed on content items in the content store 240 and stored in the edge store 245.

As further described below, a user profile may be associated with one or more financial accounts, allowing the user profile to include data retrieved from or derived from a financial account. A user may specify one or more privacy settings, which are stored in the user profile, that limit information from a financial account that the networking system 101 is permitted to access. For example, a privacy setting limits the networking system 101 to accessing the transaction history of the financial account and not the current account balance. As another example, a privacy setting limits the networking system 101 to a subset of the transaction history of the financial account, allowing the networking system 101 to access transactions within a specified time range, transactions involving less than a threshold transaction amounts, transactions associated with specified vendor identifiers, transactions associated with vendor identifiers other than specified vendor identifiers, or any other suitable criteria limiting information from a financial account identified by a user that is accessible by the networking system 101. In one embodiment, information from the financial account is stored in the user profile store 220. In other embodiments, it may be stored in the financial account store 250, which is further described below.

The content store 240 stores content items associated with a user profile, such as images, videos, or audio files. Content items from the content store 240 may be displayed when a user profile is viewed or when other content associated with the user profile is viewed. For example, displayed content items may show images or video associated with a user profile or show text describing a user's status. Additionally, other content items may facilitate user engagement by encouraging a user to expand his or her connections to other users, to invite new users to the system, or to increase interaction with the social networking system by displaying content related to users, objects, activities, or functionalities of the networking system 101. Examples of social networking content items include suggested connections or suggestions to perform other actions, media provided to or maintained by the networking system 101 (e.g., pictures or videos), status messages or links posted by users to the networking system 101, events, groups, pages (e.g., representing an organization or commercial entity), and any other content provided by, or accessible via, the networking system 101.

The content store 240 also includes one or more pages associated with entities having user profiles in the user profile store 220. An entity is a non-individual user of the networking system 101, such as a business, a vendor, an organization or a university. A page includes content associated with an entity and instructions for presenting the content to a networking system 101 user. For example, a page identifies content associated with the entity's user profile as well as information describing how to present the content to users viewing the brand page. Vendors may be associated with pages in the content store 240, allowing networking system 101 users to more easily interact with the vendor via the networking system 101. A vendor identifier is associated with a vendor's page, allowing the networking system 101 to identify the vendor and/or to retrieve additional information about the vendor from the user profile store 220, the action log 230, or from any other suitable source using the vendor identifier. In some embodiments, the content store 240 may also store one or more targeting criteria associated with stored objects and identifying one or more characteristics of a user to which the object is eligible to be presented.

The action logger 225 receives communications about user actions on and/or off the networking system 101, populating the action log 230 with information about user actions. Such actions may include, for example, adding a connection to another user, sending a message to another user, uploading an image, reading a message from another user, viewing content associated with another user, and attending an event posted by another user, among others. In some embodiments, the action logger 225 receives, subject to one or more privacy settings, transaction information from a financial account associated with a user and identifies user actions from the transaction information. For example, the action logger 225 retrieves vendor identifiers from the financial account's transaction history and identifies an object, such as a page, in the networking system 101 associated with the vendor identifier. This allows the action logger 225 to identify a user's purchases of products or services that are associated with a page, or another object, in the content store 240. In addition, a number of actions described in connection with other objects are directed at particular users, so these actions are associated with those users as well. These actions are stored in the action log 230.

The action log 230 may be used by the networking system 101 to track user actions on the networking system 101, as well as external websites or applications that communicate information to the networking system 101. Users may interact with various objects on the networking system 101, including commenting on posts, sharing links, checking-in to physical locations via a mobile device, accessing content items in a sequence, or other interactions. Information describing these actions is stored in the action log 230. Additional examples of interactions with objects on the networking system 101 included in the action log 230 include commenting on a photo album, communications between users, becoming a fan of a musician, adding an event to a calendar, joining a group, becoming a fan of a brand page, creating an event, authorizing an application, using an application, and engaging in a transaction. Additionally, the action log 230 records a user's interactions with advertisements on the networking system 101 as well as other applications operating on the networking system 101. In some embodiments, data from the action log 230 is used to infer interests or preferences of the user, augmenting the interests included in the user profile and allowing a more complete understanding of user preferences.

The action log 230 may also store user actions taken on external websites or applications and/or determined from a financial account associated with the user. For example, an e-commerce website that primarily sells sporting equipment at bargain prices may recognize a user of a networking system 101 through social plug-ins that enable the e-commerce website to identify the user of the networking system 101. Because users of the networking system 101 are uniquely identifiable, e-commerce websites, such as this sporting equipment retailer, may use the information about these users as they visit their websites. The action log 230 records data about these users, including webpage viewing histories, advertisements that were engaged, purchases made and other patterns from shopping and buying. Actions identified by the action logger 225 from the transaction history of a financial account associated with the user allow the action log 230 to record further information about additional types of user actions. In some embodiments, content of the action log 230 may be stored in the database 135.

In one embodiment, an edge store 245 stores the information describing connections between users and other objects on the networking system 101 in edge objects. Some edges may be defined by users, allowing users to specify their relationships with other users. For example, users may generate edges with other users that parallel the users' real-life relationships, such as friends, co-workers, partners and so forth. Other edges are generated when users interact with objects in the networking system 101, such as expressing interest in a page on the networking system 101, sharing a link with other users of the networking system 101, and commenting on posts made by other users of the networking system 101. The edge store 245 stores edge objects that include information about the edge, such as affinity scores for objects, interests, and other users. Affinity scores may be computed by the networking system 101 over time to approximate a user's affinity for an object, interest and other users in the networking system 101 based on the actions performed by the user. Multiple interactions between a user and a specific object may be stored in one edge object in the edge store 245, in one embodiment. In some embodiments, connections between users may be stored in the user profile store 220, or the user profile store 220 may access the edge store 245 to determine connections between users.

Ptail 280 is an internal tool in the networking system 101 to aggregate user data streams from a scribed system. The user data streams may be collected from web servers, backend servers, user scripts, and Chrome applications, etc. Periodically, Ptail 280 provides and caches Ptail checkpoints in memory of application nodes (e.g., Puma nodes 290).

Puma node 290 is a near-real-time analytic engine, which is designed for analytics and insight reports (i.e., demographic breakdowns, website analyses, Clicks, Likes, Shares, Comments, and Impressions) and can be used for processing and computing time-series data. In some embodiments, Puma node 290 may batch data for a predetermined period of time (e.g., 1.5 seconds, 20 seconds, or 5 minutes) before forwarding them for either further processing or storing them in HBase. In some embodiments, Puma node 290 may start a new batch when the last flush is completed to avoid lock contention issues.

Graph API server 295 provides a simple and consistent view of the social graph of users on the networking system 101. In some embodiments, graph API server 295 uniformly represents objects in the social graph (e.g., people, photos, events, and pages) and the connection between them (e.g., friend relationships, shared content, and photo tags). Each object in the social graph may have a unique ID. Properties of an object can be accessed by fetching them with the unique ID of the object. Alternatively, people and pages with usernames can be accessed using their usernames as their corresponding IDs.

In one embodiment, the database 135 may be defined as a computer system for serving data to users. The database 135 may be a computer system as described in FIG. 6. In some embodiments, the database 135 may include, for example, an HBase, MySQL, a Hadoop machine, a file server machine or a computer connected to multiple storage devices.

The database 135 may contain any type of computer-writable and readable storage media. By way of example, the storage media may include a volatile memory (i.e., a random access memory (RAM), etc.), a non-volatile memory (i.e., a flash memory, a read-only memory (ROM), etc.), a hard disk, an optical disc, a floppy disk, a magnetic tape, a solid-state drive (SSD), a secure digital (SD) card, or any suitable computer-readable storage medium or a combination of two or more of these.

Figure 3:
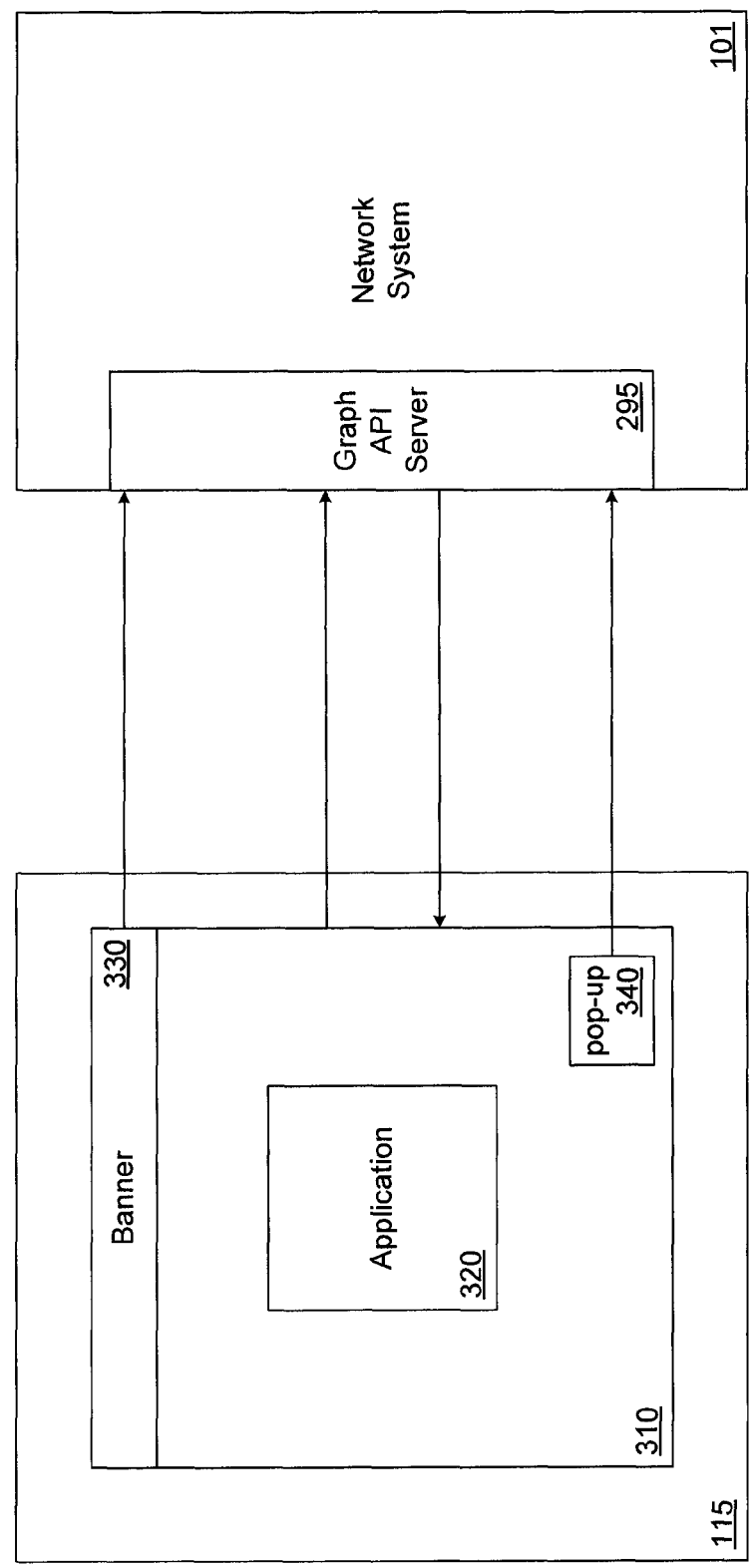
FIG. 3 illustrates a block diagram of instant personalization security in the networking system 101, in accordance with various embodiments of the present disclosure.

FIG. 3 illustrates a block diagram of instant personalization security in the networking system 101, in accordance with various embodiments of the present disclosure. The networking system 101 includes a graph API server 295 to interact with a particular user device 115. The graph API server 295 stores a fully identifying profile and a pseudonymous profile of the particular user. The particular user's fully identifying profile may include, but is not limited to, the particular user's name or UID, profile picture, gender, birthday, networks, friend list, location, language, country, likes, favorite brands, news, outlets, restaurants, and any information the particular user chooses to share.

When the particular user logs onto the networking system 101, the networking system 101 may provide a platform 310 instantiated on the particular user device 115 for the user to use applications or visit websites. The platform 310 is configured to communicate with the networking system 101 or directly with the graph API server 295.

In one embodiment, when a specific application 320 is integrated with the platform 310, the graph API server 295 may get the specific application's ID via the platform 310. The specific application's ID can be combined with the particular user's UID in the networking system and encrypted into a hashed ID (e.g., a string or an integer) according to a hash function (e.g., a one-way hash function). The hashed ID is provided to the specific application for identification of and interactions with the particular user. The specific application can use the hashed ID to identify the particular user and the prior and subsequent interactions. However, in the absence of the particular user's fully identifying UID, the specific application has no access to the particular user's fully identifying profile on the networking system 101.

The hashed ID can be unique to the particular user and the specific application. If either the application ID or UID is different, a different hashed ID can be derived. For example, when the specific application 320 is integrated with a platform of another user's device, another user's UID produces a different combination of application ID and UID, which results in a different hashed ID. For another example, when the particular user opens a different application on the platform 310 of the particular user device, a different combination of application ID and UID leads to another different hashed ID.

The hashed ID is not a function of time and remains the same if the hash function and the combination of application ID and UID are unchanged. For example, the same hashed ID can be derived regardless whether the particular user opens the specific application today or 30 days from now as long as the hash function and the combined IDs remain the same.

In one embodiment, a banner 330 can be provided on the platform 310 for the particular user to authorize or reject the specific application to access his or her fully identifying profile in the networking system 101. The banner's size, text size/color, and location on the display screen are determined by the attributes of the specific application and the particular user's preferences. For example, the banner can be placed on the top or bottom of the display window. For another example, the banner can be a rolling ticker to attract attention from the particular user. The banner requires the particular user to affirmatively click on one of the options (e.g., "allow," "reject," or "cross-out") provided by the banner. In the absence of the user's affirmative authorization, the specific application can access only the hashed ID. In some implementations, the specific application may also access some pseudonymous basic information of the particular user via the hashed ID. The pseudonymous basic information may include, for example, first name, last initial, and profile photo URLs.

In another embodiment, a pop-up box 340 can also be provided on the platform 310 for the particular user to authorize or reject the specific application to access his or her fully identifying profile. The pop-up box can be introduced non-intrusively so it does not interrupt the particular user's experience with the specific application. For example, the background of the pop-up box can be transparent. For another example, a visual or an audio notification can be provided for the particular user. The visual notification may include bold, blinking, or some other ways to make the pop-up box prominent. Alternatively, the audio notification may include, but not be limited to, a beep or other sounds.

In some embodiments, the pop-up box may open in front of the specific application's window, thereby forcing the particular user to take affirmative action, such as, for example, authorizing or rejecting the specific application to access his or her fully identifying profile or closing the pop-up box.

In some embodiments, the banner and/or the pop-up box may be presented to the particular user on GUI interfaces different from that of the specific application. The particular user may choose to bring the specific application in front of or behind the banner and/or the pop-up box.

The particular user may authorize the specific application by selecting an authorization option or simply crossing-out the banner or the pop-up box. Upon authorization from the particular user, an access token is provided to the specific application to access a subset of the particular user's fully identifying profile. With the access token, the specific application may get the particular user's first name and last initial, profile picture, gender, networks, friend list, location, language, country, and other information that the particular user would like to share with everyone else.

Based on an authorized profile of the particular user, the specific application may offer the particular user additional personalized experiences and services. These personalized services may be helpful for the particular user to deepen personal connections with other users and help the particular user discover additional interesting and meaningful information.

For example, the authorized profile may include the particular user's likes or past statements on "community pages" of the networking system 101. If the particular user likes a musical artist, for example "U2," the first song the particular user hears, when visiting Pandora, may be a "U2" song or something Pandora considers similar.

In some embodiments, options with multiple levels of privacy can be included in the banner and/or the pop-up box so that the particular user may select and authorize different levels (e.g., level 1, level 2 and level 3) of privacy for any specific application. For example, under level 1, the specific application may only access a basic subset of the particular user's fully identifying profile, for example, the particular user's first name, last name, and profile picture, etc. Under level 2, additional information is added to the subset under level 1, for example, the particular user's gender, location, friend list, language, and/or country, etc. Under level 3, the specific application may access the entire profile of the particular user in the networking system 101, including all information that the particular user would like to share with the public. In some embodiments, the banner and/or the pop-up box may provide scrollbars for the particular user to select and authorize a specific level of privacy.

In some embodiments, the particular user may take alternative affirmative actions to authorize the specific application accessing his or her fully identifying profile in the networking system 101. For example, the particular user may authorize to for pay the specific application with the particular user's account on the networking system 101 or respond to a permission dialog from the specific application (e.g., entering the particular user's birthday). The networking system 101 may treat these alternative actions from the particular user as an authorization to release his or her fully identifying profile to the specific application.

In some embodiments, authorization from the particular user may be conditioned upon promises from the specific application's provider of not releasing the particular user's fully identifying profile to any other third-party application, service, and/or product providers. The authorized profile may be used by the specific application only to enhance experience and services to the particular user.

When the particular user takes an affirmative action authorizing or declining the specific application to access his or her fully identifying profile, the banner and/or the pop-up box for the specific application may fade away permanently. In some embodiments, the banner and/or the pop-up box are presented to the particular user every time the particular user re-opens the specific application. Even if the particular user has granted the specific application access to his or her fully identifying profile on a prior occasion, the particular user may choose to rescind the authorization or disable the specific application altogether. When the particular user rescinds a prior authorization, the platform 310 or the graph API server 295 may act as a proxy to request the specific application's server(s) and provider(s) to delete the particular user's fully identifying profile.

In some embodiments, in the absence of authorization from the particular user, the hashed ID may be provided to the specific application together with other pseudonymous profiles of the particular user (e.g., the particular user's profile photo and/or first name and last initial). The hashed IDs and the particular user's other pseudonymous profiles can be used by other users of the specific application to identify, invite, and communicate with the particular user.

In some embodiments, in addition to the particular user's UID and the specific application's ID, the birthday of the particular user is also combined and used to generate a hashed ID/birthday. The hashed ID/birthday may represent a blurred version of the particular user's fully identifying profile. The hashed ID/birthday can be used by the specific application and other users of the specific application to identify and communicate with the particular user.

In some embodiments, instant personalization security may be implemented on desktop web pages and mobile web pages. For example, the networking system 101 may host an iFrame on a particular user device. The iFrame communicates with the graph API server 295 and the networking system 101 on behalf of the particular user. When a mobile application or web page is opened on the iFrame, the iFrame sends the mobile application ID or web page server ID to the networking system 101. A banner and/or a pop-up box may also be provided on the iFrame interface for the particular user to authorize the mobile application or web page to access the user's fully identifying profile in the networking system 101. Upon receiving a hashed ID and/or an access token from the networking system 101, the iFrame releases the received hashed ID and/or access token to the mobile application or web page.

Figure 4:
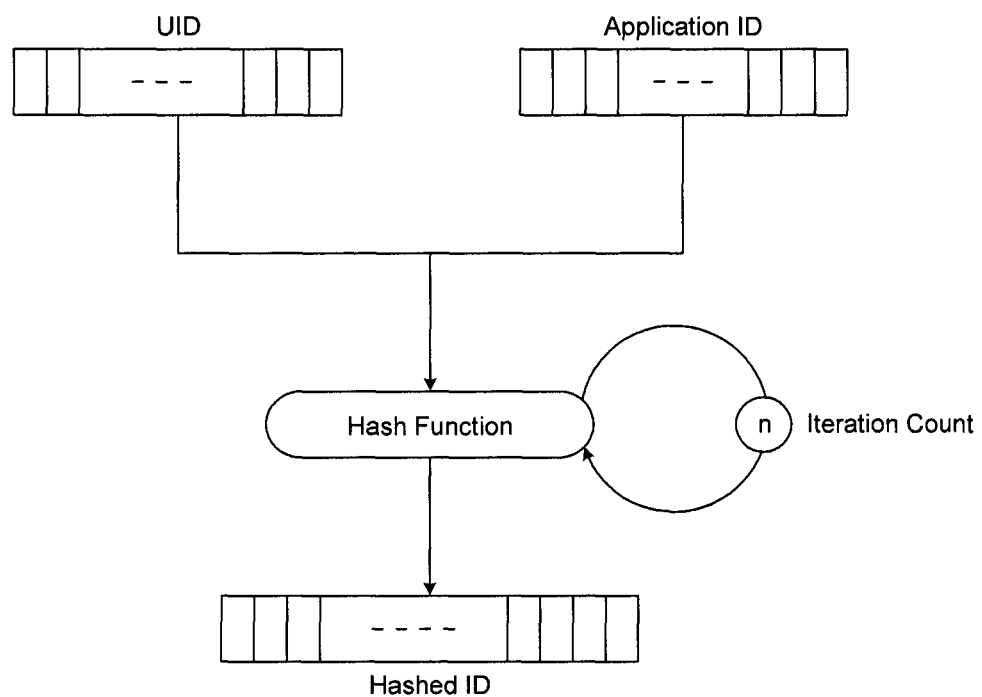
FIG. 4 illustrates examples of generating a hashed ID, in accordance with various embodiments of the present disclosure.

FIG. 4 illustrates examples of generating a hashed ID, in accordance with various embodiments of the present disclosure. When the specific application 320 is integrated with the platform 310, the platform 310 gets the ID of the specific application 320 and sends it over to the networking system 101 or directly to the graph API server 295. The networking system 101 combines the specific application's ID with the particular user's UID in the networking system 101 and encrypts the combined IDs into a hashed ID by a hash function. The hash function may include, but is not limited to, GOST, HAVAL, MD2, MD4, MD5, PANAMA, RADIOGATUN, RIPEMD, RIPEMD-128/256, RIPEMD-160, RIPEMD-320, SHA-0, SHA-1, SHA-256/224, SHA-512/384, SHA-3, TIGER(2)-192/160/128, WHIRLPOOL, or any combination thereof.

In one embodiment, to add extra security to the hashed ID, a sequence of bytes (i.e., "the salt") can be added to the combined IDs before being passed through the hash function. The salt can be a fixed sequence of bytes, a variable sequence of bytes, and/or a randomly generated sequence of bytes. The added sequence of bytes can protect the hashed ID against dictionary attacks.

In another embodiment, the hash function is iteratively applied to the combined IDs for n times. In the first repetition, the combined IDs are passed as input to the hash function. In subsequent repetitions, output of the hash function is passed as input to the same hash function. The same process is repeated n times, in which n can be equal or larger than 1,000, to generate the final hashed ID. Applying the hash function with n iteration counts can add a good amount of extra security to instant personalization against brute-force attacks. Attackers would have to endure an enormous amount of tentative hash function digests when brute-forcing.

Figure 5:
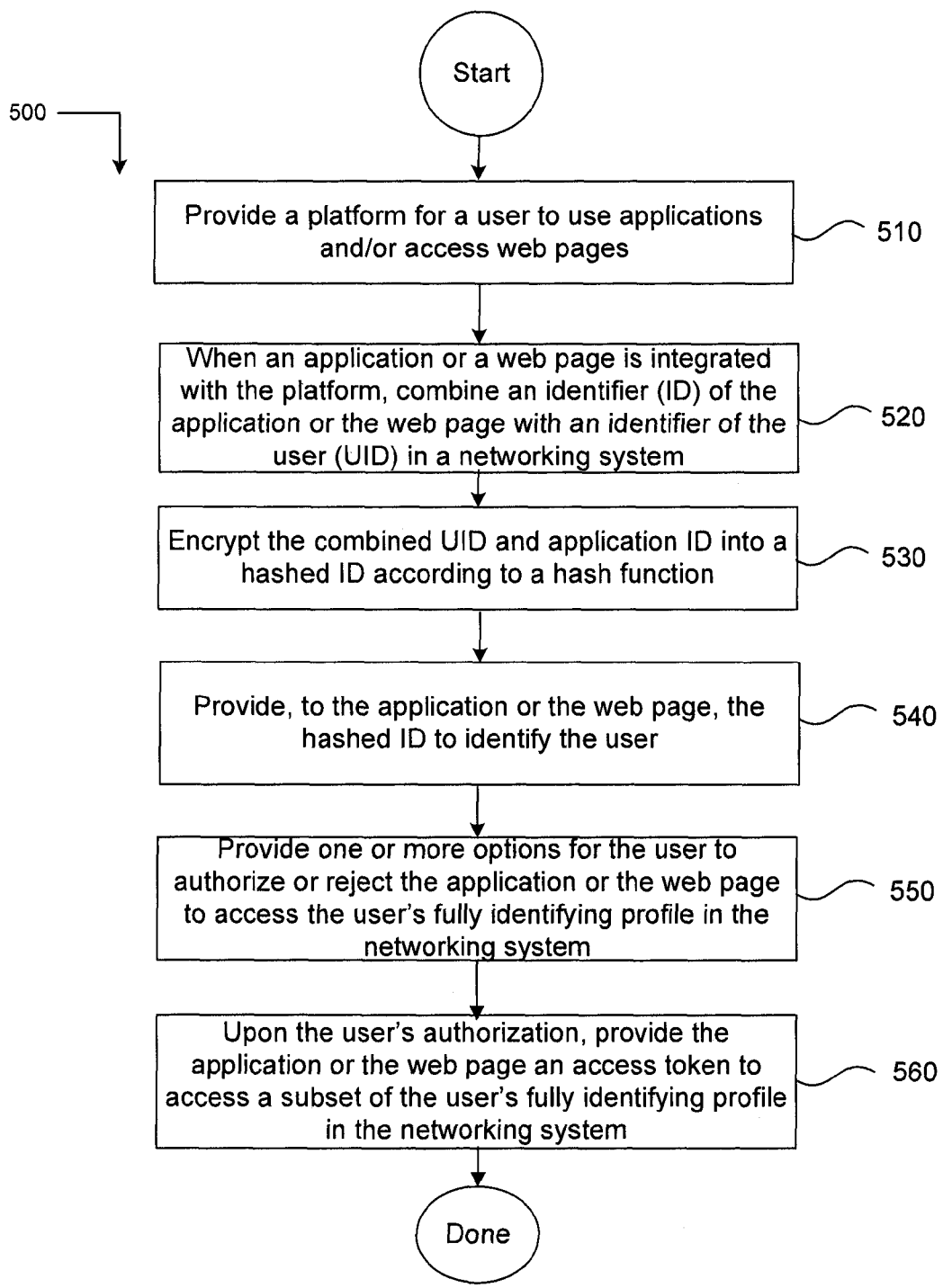
FIG. 5 illustrates a flow chart showing a set of operations 500 that may be used for instant personalization security in the networking system 101, in accordance with various embodiments of the present disclosure.

FIG. 5 illustrates a flow chart showing a set of operations 500 that may be used for instant personalization security in the networking system 101, in accordance with various embodiments of the present disclosure. At step 510, a platform 310 is provided on a particular user device 115 for the particular user to use applications and/or access web sites. The platform 310 may communicate with a graph API server 295 in the networking system 101. When a specific application is integrated with the platform 310, at step 520, the specific application's ID may be sent to the platform 310 and combined with the particular user's UID. In some embodiments, the platform 310 may combine the specific application's ID with the particular user's UID and send the combined IDs to the networking system 101.

At step 530, the combined IDs of the particular user and the specific application are encrypted into a hashed ID according to a hash function. In one embodiment, a sequence of bytes may be added to the combined IDs to increase the security level of the hashed ID. In another embodiment, the final hashed ID is generated by applying the hash function to the salted combined IDs and then passing the output of the hash function as an input to the same hash function for n times, in which n can be greater or equal to 1,000.

At step 540, the hashed ID is a unique number for the particular user and can be provided for the specific application to identify the particular user. The hashed ID can also be used for the particular user to communicate with other users of the specific application. In some embodiments, pseudonymous profiles of the particular user, such as first name, last initial, and/or profile photo, may also be provided to the specific application for identification and communications between users of the specific application.

At step 550, one or more options are provided for the particular user to take affirmative actions either to authorize or reject the specific application to access the particular user's fully identifying profile. In one embodiment, the particular user may make a selection by clicking on a banner or a pop-box presented on the platform 310. In another embodiment, the networking system 101 may analyze the particular user's alternative actions to determine whether the particular user intends the specific application to access his or her fully identifying profile.

At step 560, upon the particular user's authorization, an access token is provided to the specific application to access a subset of the particular user's fully identifying profile. In one embodiment, the banner and/or the pop-up box may include multiple levels of privacy for the particular user to designate for the specific application. Each level of privacy corresponds to a specific subset of the user's fully identifying profile. If the particular user authorizes a particular level of privacy for the specific application, the corresponding subset of the user's fully identifying profile is released to the specific application for providing personalized experience and services for the particular user.

While the method 500 of FIG. 5 is described in the context of a single networking system, the present disclosure contemplates a plurality of networking systems and/or servers. The plurality of networking systems and/or servers can be located at a single location or a variety of locations.

Figure 6:
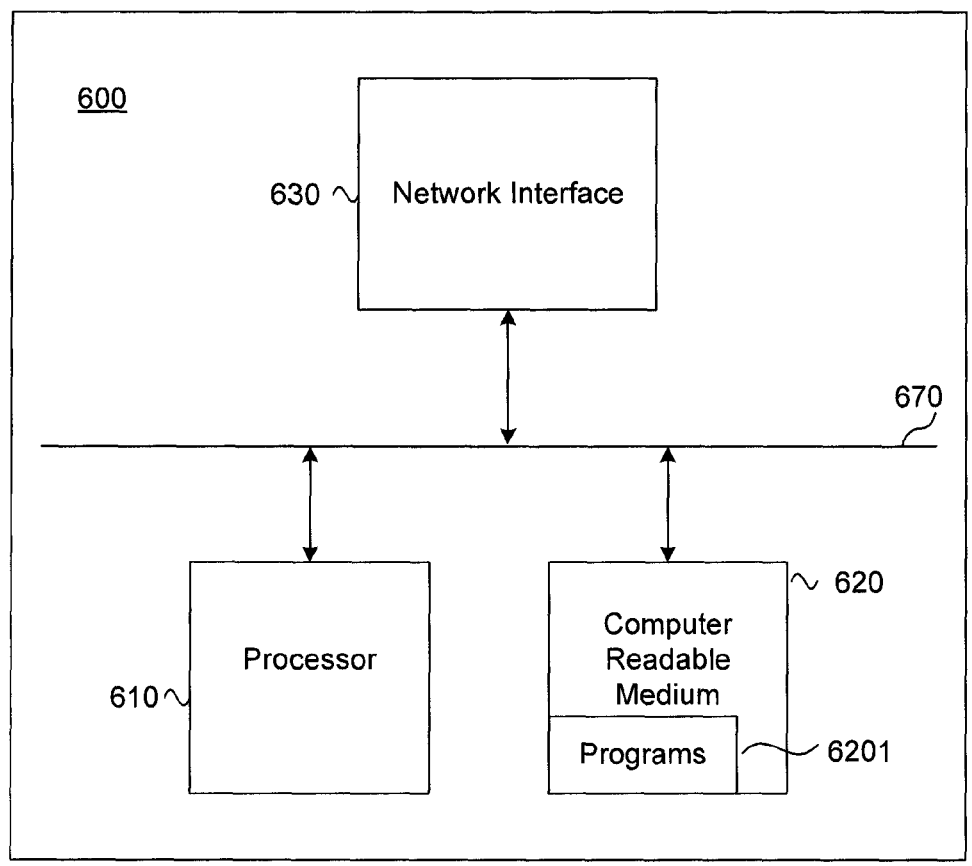
FIG. 6 illustrates an example of a computer system with which some embodiments of the present disclosure may be utilized.

FIG. 6 illustrates a diagram of a computer system 600, in accordance with yet another embodiment of the present disclosure. The computer system 600 may include at least one processor 610, one or more network interface 630 and one or more computer readable medium 620, all interconnected via one or more bus 670. In FIG. 6, various components are omitted for illustrative simplicity. The computer system 600 is intended to illustrate a device on which any other components described in this specification (i.e., any of the components depicted in FIGS. 1-5) can be implemented.

The computer system 600 may take a variety of physical forms. By way of example, the computer system 600 may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (e.g., a BeagleBoard, a PC-on-a-stick, a Cubieboard, a CuBox, a Gooseberry, a Hawkboard, an Mbed, an OmapZoom, an Origenboard, a Pandaboard, a Pandora, a Rascal, a Raspberry Pi, a SheevaPlug, a Trim-Slice, etc.), an embedded computer system, or a combination of two or more of these. Where appropriate, the computer system 600 may include one or more computer systems 600, be unitary or distributed, span multiple locations, span multiple machines, or reside in a cloud, which may include one or more cloud components in one or more networks. Where appropriate, one or more computer systems 600 may perform without substantial spatial or temporal limitation one or more steps of one or more methods described or illustrated herein.

As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The computer system 600 preferably may include an operating system such as but not limited to Windows®, Linux® or Unix®. The operating system may include a file management system, which organizes and keeps track of files. In some embodiments, a separate file management system may be provided. The separate file management system can interact smoothly with the operating system and provide enhanced and/or more features, such as improved backup procedures and/or stricter file protection.

The at least one processor 610 may be any suitable processor. The type of the at least one processor 610 may comprise one or more from a group comprising a central processing unit (CPU), a microprocessor, a graphics processing unit (GPU), a physics processing unit (PPU), a digital signal processor, a network processor, a front end processor, a data processor, a word processor, and an audio processor.

The one or more bus 670 is configured to couple components of the computer system 600 to each other. As an example and not by way of limitation, the one or more bus 670 may include a graphics bus (e.g., an Accelerated Graphics Port (AGP)), an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 630 may include one or more of a modem or network interface. It will be appreciated that a modem or network interface can be considered to be part of the computer system 600. The interface can include an analog modem, an asymmetric digital subscribe line (ADSL) modem, a cable modem, a doubleway satellite modem, a power line modem, a token ring interface, a Cambridge ring interface, a satellite transmission interface, or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a Tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 6 reside in the interface.

The computer-readable medium 620 may include any medium device that is accessible by the processor 610. As an example and not by way of limitation, the computer-readable medium 620 may include volatile memory (i.e., a random access memory (RAM), a dynamic RAM (DRAM), and/or a static RAM (SRAM)) and non-volatile memory (e.g., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer-readable medium 620 may include a semiconductor-based or other integrated circuit (IC) (e.g., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, an SD drive, or another suitable computer-readable storage medium or a combination of two or more of these, where appropriate. The computer readable medium 620 may be volatile, non-volatile, or a combination of volatile and non-volatile, where appropriate.

Programs 6201 may be stored on the one or more computer-readable media 620. As an example, but not by way of limitation, the computer system 600 may load the programs 6201 to an appropriate location on the one or more compute readable media 620 for execution. The programs 6201, when executed, may cause the computer system 600 to perform one or more operations or one or more methods described or illustrated herein. In some implementations, the operations may include, but are not limited to, providing a platform for a user to use applications and/or access web pages; when a specific application or a web page is integrated with the platform, combining an identifier (the specific application's ID) of the application or the web page with an identifier of the user (the particular user's UID) in a networking system; encrypting the combined UIDIDs of the particular user and the specific application ID into a hashed ID according to a hash function; providing, to the application or the web page, the hashed ID for the specific application to identify the particular user; providing one or more options for the particular user to authorize or reject the specific application or the web page to access the user's fully identifying profile; and upon the particular user's authorization, providing the specific application or the web page an access token to access a subset of the particular user's fully identifying profile in the networking system.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and certain aspects of the operations may be offloaded to the cloud.

While the computer-readable medium 620 is shown in an embodiment to be a single medium, the term "computer-readable medium" shall be taken to include a single medium or multiple media (e.g., a centralized or distributed database and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, or Digital Versatile Disks, among others, and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a stand-alone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct a more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module, or sequence of instructions referred to as "programs." The programs typically comprise one or more instructions that are set at various times in various memory and storage devices in a computer and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms. Thus, the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list, and any combination of the items in the list.

The above Detailed Description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps or employ systems having blocks in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation while still being encompassed by the subject matter disclosed herein. As noted above, particular terminology used when describing certain features, or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

What is claimed is:

1. A method comprising:
providing a platform for a user to use applications and/or access web pages;
when an application or a web page is integrated with the platform, combining at least an identifier of the application or the web page (application ID) with an identifier of the user (UID) and the birthday of the user in a social networking system into a combined string;
encrypting the combined string into a hashed ID according to a hash function;
linking the hashed ID with a pseudonymous profile of the user, wherein the pseudonymous profile includes the user's profile picture, URLs, first name, or last initial;
providing, to the application or the web page, the hashed ID to identify the user;
providing one or more options for the user to authorize or reject the application or the web page to access the user's fully identifying profile; and
upon the user's authorization, providing the application or the web page an access token to access a subset of the user's fully identifying profile in the social networking system.

2. The method of claim 1, wherein the user's fully identifying profile in the social networking system includes the user's name and/or UID, profile picture, gender, birthday, networks, friend list, location, language, country, likes, favorite brands, news, outlets, restaurants, information that the user chooses to share with every user on the social networking system, or any combination thereof.

3. The method of claim 2, wherein the hash function is a one-way hash function including GOST, HAVAL, MD2, MD4, MD5, PANAMA, RADIOGATUN, RIPEMD, RIPEMD-128/256, RIPEMD-160, RIPEMD-320, SHA-0, SHA-1, SHA-256/224, SHA-512/384, SHA-3, TIGER(2)-192/160/128, WHIRLPOOL, or any combination thereof.

4. The method of claim 1, further comprising:
linking the hashed ID with the pseudonymous profile of the user; and
providing the application or the web page access to the pseudonymous profile;
wherein the pseudonymous profile includes the user's profile picture, first name, last initial, other non-fully identifying profile information, or any combination thereof.

5. The method of claim 1, further comprising: providing a pop-up box on the platform for the user to authorize or reject the application or the web page to access the user's fully identifying profile.

6. The method of claim 5, wherein the pop-up box and the application or the web page are displayed on different GUI interfaces.

7. The method of claim 1, further comprising: providing a banner on the platform for the user to authorize or reject the application or the web page to access the user's fully identifying profile; wherein the banner's size, text size/color and location on the platform are determined by one or more attributes of the application or the web page and the user's preferences.

8. The method of claim 7, further comprising:
analyzing the user's activities outside the banner on the platform regarding the application or the web page; and
providing the application or the web page the access token when the user's activities outside the banner are equivalent to making a selection on the banner, to authorize the application or the web page to access the user's fully identifying profile.

9. The method of claim 8, further comprising:
when the user rescinds a prior authorization or decides to disable the application or the web page, standing proxy to request provider of the application or the web page to delete the user's fully identifying profile.

10. The method of claim 1, further comprising: adding a sequence of bytes to the combined string before passing the combined string through the hash function; wherein the sequence of bytes are a fixed sequence of bytes, a variable sequence of bytes, a randomly generated sequence of bytes, or any combination thereof.

11. A social networking system comprising:
memory and a computer processor; and
an application program instantiated by the computer processor, wherein the application provides computer-generated output;
wherein the computer processor is configured to:
provide a platform for a user to use applications and/or access web pages;
when an application is integrated with the platform, combine an identifier of the application (application ID) with an identifier of the user (UID) and the birthday of the user in the social networking system;
encrypt the combined UID, birthday and application ID into a hashed ID according to a hash function;
link the hashed ID with a pseudonymous profile of the user; wherein the pseudonymous profile includes the user's profile picture, URLs, first name, or last initial;
provide, to the application, the hashed ID to identify the user;
provide one or more options for the user to authorize or reject the application to access the user's fully identifying profile; and
upon the user's authorization, provide the application an access token to access a subset of the user's fully identifying profile in the social networking system.

12. The social networking system as recited in claim 11, wherein the user's fully identifying profile in the social networking system includes the user's name, UID, profile picture, gender, birthday, networks, friend list, location, language, country, likes, favorite brands, news, outlets, restaurants, information that the user chooses to share with every user on the social networking system, or any combination thereof.

13. The social networking system as recited in claim 12, wherein the hash function is a one-way hash function including GOST, HAVAL, MD2, MD4, MD5, PANAMA, RADIOGATUN, RIPEMD, RIPEMD-128/256, RIPEMD-160, RIPEMD-320, SHA-0, SHA-1, SHA-256/224, SHA-512/384, SHA-3, TIGER(2)-192/160/128, WHIRLPOOL, or any combination thereof.

14. The social networking system as recited in claim 13, wherein the computer processor is configured to:
link the hashed ID with the pseudonymous profile of the user; and
provide the application access to the pseudonymous profile;
wherein the pseudonymous profile includes the user's profile pictures, first name, last initial, other non-fully identifying profile information, or any combination thereof.

15. The social networking system as recited in claim 13, wherein the computer processor is configured to provide a pop-up box on the platform for the user to authorize or reject the application to access the user's fully identifying profile.

16. The social networking system as recited in claim 15, wherein the pop-up box and the application are displayed on different GUI interfaces.

17. The social networking system as recited in claim 13, wherein the computer processor is configured to provide a banner on the platform for the user to authorize or reject the application to access the user's fully identifying profile; and wherein the banner's size, text size/color and location on the platform are determined by one or more attributes of the application and the user's preferences.

18. The social networking system as recited in claim 17, wherein the computer processor is configured to:
analyze the user's activities outside the banner on the platform regarding the application; and
provide the application the access token if the user's activities outside the banner are equivalent to making a selection on the banner to authorize the application to access the user's fully identifying profile.

19. The social networking system as recited in claim 17, wherein the computer processor is configured to:
when the user rescinds a prior authorization or decides to disable the application, stand proxy to request provider of the application to delete the user's fully identifying profile.

20. A method comprising:
providing a platform on a user device for a user to use applications and/or access web pages;
when an application is integrated with the platform, combining an identifier (ID) of the application, an identifier of the user (UID) and the user's birthday in a social networking system;
encrypting the combined application ID, UID and the user's birthday into a hashed ID according to a hash function;
linking the hashed ID with pseudonymous profile of the user; wherein the pseudonymous profile includes the user's profile picture, URLs, first name, last initial, or any combination thereof;
providing, to the application or the web page, the hashed ID to identify the user;
providing one or more options for the user to authorize or reject the application to access the user's fully identifying profile; and
upon the user's authorization, providing the application an access token to access a subset of the user's fully identifying profile in the social networking system.

* * * * *